United States Patent
Makino

(10) Patent No.: US 8,818,116 B2
(45) Date of Patent: Aug. 26, 2014

(54) IMAGE PROCESSING APPARATUS AND IMAGE PROCESSING METHOD

(75) Inventor: Yoshihiro Makino, Chiba (JP)

(73) Assignee: Sony Corporation (JP)

( * ) Notice: Subject to any disclaimer, the term of this patent is extended or adjusted under 35 U.S.C. 154(b) by 96 days.

(21) Appl. No.: 13/552,810

(22) Filed: Jul. 19, 2012

(65) Prior Publication Data

US 2013/0028527 A1 Jan. 31, 2013

(30) Foreign Application Priority Data

Jul. 27, 2011 (JP) ................................. 2011-163914

(51) Int. Cl.
*G06K 9/36* (2006.01)
*H04N 1/409* (2006.01)

(52) U.S. Cl.
CPC .................................. *H04N 1/4092* (2013.01)
USPC ....................................................... 382/232

(58) Field of Classification Search
CPC ....... G06K 9/00463; G06K 9/38; G06K 9/40; G06K 9/328; G06T 5/001; G06T 5/20; H04N 1/40006; H04N 1/4092
See application file for complete search history.

(56) References Cited

U.S. PATENT DOCUMENTS

| | | | |
|---|---|---|---|
| 7,355,755 B2 * | 4/2008 | Suino et al. | 358/3.15 |
| 7,471,830 B2 * | 12/2008 | Lim et al. | 382/181 |
| 7,505,632 B2 * | 3/2009 | Hu et al. | 382/275 |
| 7,773,808 B2 * | 8/2010 | Lim et al. | 382/181 |
| 7,978,365 B2 * | 7/2011 | Nabeshima | 358/1.9 |
| 2009/0297114 A1 | 12/2009 | Miyata et al. | |

FOREIGN PATENT DOCUMENTS

JP 2009-278326 A 11/2009

* cited by examiner

*Primary Examiner* — Jose Couso
(74) *Attorney, Agent, or Firm* — Lerner, David, Littenberg, Krumholz & Mentlik, LLP

(57) ABSTRACT

Disclosed herein is an image processing apparatus, including: a band information acquisition unit configured to acquire band information of each of a plurality of blocks acquired by dividing a screen on the basis of input image data; and a domain separation unit configured to separate a screen into a plurality of types of domains on the basis of the band information of each of the plurality of blocks acquired by the band information acquisition unit. The apparatus further includes a processing force computation block configured to obtain a processing force for each of the plurality of types of screen domains obtained by the domain separation unit; and an image processing block configured to execute predetermined image processing on the input image data for each of the plurality of types of screen domains separated by the domain separation unit with a processing force separated by the processing force computation block.

9 Claims, 6 Drawing Sheets

FIG. 4

| MOTION/ MOTIONLESS DECISION RESULT | FIRST BAND INFORMATION (BPF INTEGRATION RESULT) | SECOND BAND INFORMATION (HPF INTEGRATION RESULT) | |
|---|---|---|---|
| | | SMALL | LARGE |
| MOTION DOMAIN | SMALL | IMAGE DOMAIN (LOW-QUALITY) | CHARACTER DOMAIN |
| | LARGE | IMAGE DOMAIN (HIGH-QUALITY) | IMAGE DOMAIN (HIGH-QUALITY) + CHARACTER DOMAIN |
| MOTIONLESS DOMAIN | SMALL | IMAGE DOMAIN (LOW-QUALITY) | CHARACTER DOMAIN |
| | LARGE | IMAGE DOMAIN (HIGH-QUALITY) | IMAGE DOMAIN (HIGH-QUALITY) + CHARACTER DOMAIN |

FIG. 5A

SECOND BLOCK DECISION RESULT EXAMPLE

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 1 | 1 | 1 | 1 | 0 | 0 |
| 0 | 0 | 1 | 1 | 1 | 1 | 0 | 0 |
| 0 | 0 | 1 | 1 | 1 | 1 | 0 | 0 |
| 0 | 0 | 1 | 1 | 1 | 1 | 0 | 0 |
| 0 | 0 | 1 | 1 | 1 | 1 | 0 | 0 |
| 0 | 0 | 0 | 0 | 0 | 0 | 0 | 0 |

0: MOTIONLESS DOMAIN
1: MOTION DOMAIN

FIG. 5B

FIRST BLOCK DECISION RESULT EXAMPLE

| 0 | 0 | 0 | 0 | 0 | 0 | 0 | 0 |
|---|---|---|---|---|---|---|---|
| 0 | 0 | 2 | 2 | 2 | 2 | 0 | 0 |
| 0 | 2 | 1 | 1 | 1 | 1 | 2 | 0 |
| 0 | 2 | 1 | 1 | 1 | 1 | 2 | 0 |
| 0 | 2 | 1 | 1 | 1 | 1 | 2 | 0 |
| 0 | 2 | 1 | 1 | 1 | 1 | 2 | 0 |
| 0 | 2 | 1 | 1 | 1 | 1 | 2 | 0 |
| 0 | 2 | 2 | 2 | 2 | 2 | 0 | 0 |

0: CHARACTER DOMAIN
1: IMAGE DOMAIN
2: CHARACTER DOMAIN + IMAGE DOMAIN

IMAGE PROCESSING APPARATUS AND IMAGE PROCESSING METHOD

CROSS-REFERENCE TO RELATED APPLICATION

The present application claims priority from Japanese Patent Application No. JP 2011-163914 filed in the Japanese Patent Office on Jul. 27, 2011, the entire content of which is incorporated herein by reference.

BACKGROUND

The present technology relates to an image processing apparatus and an image processing method and, more particularly, to an image processing apparatus and so on that are configured to execute the processing of image data possibly containing character information.

A technique is known that, with television receivers, sharpness processing is executed on image data in order to enhance image sharpness, for example, refer to Japanese Patent Laid-open No. 2009-278326.

SUMMARY

The above-mentioned related-art sharpness processing is uniformly executed on a frame basis. If the uniform processing is executed on the image data of content in which both image and character are present, the image sharpness increases but the character quality lowers. Such a problem is also encountered with other image processing operations; noise reduction processing to be executed on the image data of content in which both image and character are present in order to remove block noise, for example. This noise reduction processing is intended to blur an image in order to remove block noise, thereby lowering character quality.

Therefore, the present technology addresses the above-identified and other problems associated with related-art methods and apparatuses and solves the addressed problems by providing an image processing apparatus and an image processing method that are configured to properly execute image processing on image data in which both image and character are present.

In carrying out the technology and according to one embodiment thereof, there is provided an image processing apparatus. This image processing apparatus has a band information acquisition unit configured to acquire band information of each of a plurality of blocks acquired by dividing a screen on the basis of input image data; a domain separation unit configured to separate a screen into a plurality of types of domains on the basis of the band information of each of the plurality of blocks acquired by the band information acquisition unit; a processing force computation block configured to obtain a processing force for each of the plurality of types of screen domains separated by the domain separation unit; and an image processing block configured to execute predetermined image processing on the input image data for each of the plurality of types of screen domains separated by the domain separation unit with a processing force separated by the processing force computation block.

In the embodiments of the present technology, band information of each of the blocks acquired by dividing a screen into two or more blocks is acquired by the band information acquisition unit on the basis of input image data. For example, the band information acquisition unit integrates, block by block, the band pass components of the pixels acquired by executing band pass filter computation on the input image data, thereby acquiring the first band information (or the band pass component information) of each block. The band information acquisition unit integrates, block by block, the high pass components of the pixels acquired by executing high pass filter computation on the input image data, thereby acquiring the second band information (or the high pass component information) of each block.

The domain separation unit separates a screen into two or more types of domains on the basis of the band information of each of the blocks acquired by the band information acquisition unit. The resultant domains are a low-quality image domain, a high-quality image domain, a character domain, and an image and character domain, for example. For example, the domain separation unit determines to which of the two or more types of domains each block belongs on the basis of the band information of each block. On the basis of an obtained decision result, the domain separation unit extracts a rectangular domain in which two or more blocks are included as the two or more types of domains, thereby separating a screen into the two or more types of domains.

The processing force computation block obtains a processing force for each of the domains separated by the domain separation unit. For example, a fixed value of processing force is obtained for each of the two or more types of screen domains. In this case, for example, the processing force of the low-quality image domain is increased and the processing forces of other image domains are decreased.

The image processing block executes predetermined image processing on the input image data for each of the screen domains separated by the domain separation unit by use of the processing force obtained by the processing force computation block. The predetermined image processing includes sharpness processing for enhancing sharpness of an image and noise reduction processing for removing MPEG block noise, for example.

As described above, in the embodiments of the present technology, a screen is separated into two or more domains on the basis of the band information of each of two or more blocks and image processing is executed on input image data by obtaining a processing force for each of the screen domains separated by the separation processing. Consequently, the image processing on the image data of content in which both images and characters are present at the same time can be executed in a proper and good manner.

In addition, in the embodiments of the present technology, it is determined to which of two or more types of domains each of two or more blocks belongs on the basis of the band information of each block and, on the basis of a resultant decision, a rectangular domain in which two or more blocks are included as the two or more types of domains, thereby separating a screen into the two or more domains. Therefore, a block determined belonging to the character domain enclosed by blocks determined belonging to the image domain, namely, an isolated point, can be removed in the extraction of the rectangular domain, thereby preventing the conspicuousness of the connection between the blocks.

It should be noted that, in the embodiments of the present technology, the processing force computation block may be configured to obtain a processing force corresponding to the blend index of the first band information and the second band information described above for each of the blocks with respect to the low-quality image domain and the high-quality image domain, for example. Consequently, a proper processing force corresponding to the quality of image can be obtained for each of the blocks with respect to the image domains, thereby executing the image processing in the image domains in a proper and good manner.

In the embodiments of the present technology, a motion/motionless decision block may be provided for determining on the basis of the input image data in which of a motion domain and a motionless domain each of the plurality of blocks is included. On the basis of the band information of each of the plurality of blocks, the domain separation unit extracts a rectangular domain in which a plurality of blocks are included as the plurality of types of domains on the basis of the decision result obtained by the determination to which of the plurality of types of domains each of the plurality of blocks belongs as well as the decision result obtained by the motion/motionless decision block.

The image domains often have motions, while the character domain is often motionless. Use of the decision in which of the motion domain and the motionless domain each block is included allows the changing of the decision the block determined belonging to the character domain enclosed by the blocks determined belonging to the image domain, namely, the isolated point, to the image domain, in a proper manner, for example. Further, use of the decision in which of the motion domain and the motionless domain each block is included allows the determination of the rectangular boundary between the image domain and the image and character domain more properly. To be more specific, use of the decision in which of the motion domain and the motionless domain each block is included allows the accuracy of the extraction of the rectangular boundary.

In the embodiments of the present technology, the motion/motionless decision block determines in which of the motion domain and the motionless domain each of the plurality of blocks is included on the basis of a frame difference of the band information of each of the plurality of blocks acquired by the band information acquisition unit. Consequently, the computation load required for the decision processing can be minimized.

As described above and according to the embodiments of the present technology, the image processing on the image data of content in which both images and characters are present at the same time can be executed in a proper and good manner.

BRIEF DESCRIPTION OF THE DRAWINGS

FIG. 4 is a diagram illustrating domain decisions that are executed on the basis of first band information (or band pass component information) and second band information (or high pass component information);

FIGS. 5A and 5B are diagrams illustrating examples of the first block decision result of determining which of a low-quality image domain, a high-quality image domain, a character domain, and an image and character domain is identified and the second block decision result of determining which of a motion domain and a motionless domain is identified.

DETAILED DESCRIPTION OF THE PREFERRED EMBODIMENTS

This technology will be described in further detail by way of embodiments thereof with reference to the accompanying drawings. The description will be executed in the following order:

1. Embodiments
2. Variations

<1. Embodiments>

[Exemplary Configuration of Television Receiver]

Figure 1:
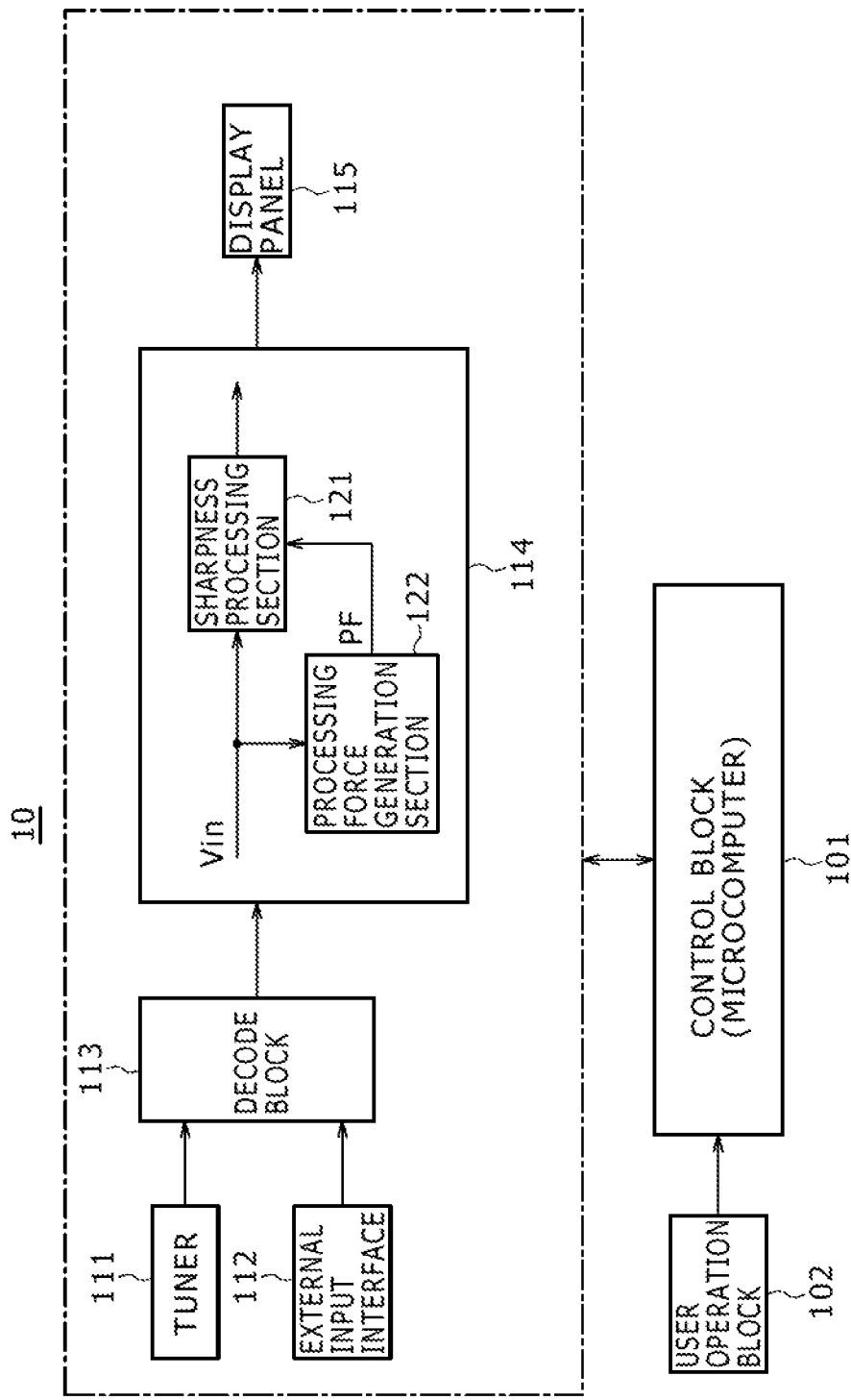
FIG. 1 is a block diagram illustrating an exemplary configuration of a television receiver practiced as one embodiment of the technology.

Now, referring to FIG. 1, there is shown an exemplary configuration of a television receiver 10 practiced as one embodiment of the technology. This television receiver 10 has a control block 101 and a user operation block 102. In addition, the television receiver 10 has a tuner 111, an external input interface 112, a decode block 113, an image processing block 114, and a display panel 115.

The control block 101 is configured by a microcomputer. The control block 101 controls operations of component blocks of the television receiver 10. The user operation block 102 makes up a user interface and is connected to the control block 101. The user operation block 102 is configured by keys, buttons, and dials arranged on the housing, not shown of the television receiver 10 or is configured by a remote controller.

The tuner 111 receives BS (Broadcasting Satellite) broadcasting, terrestrial wave digital broadcasting, and so on. This tuner 111 receives broadcast signals captured by an antenna, not shown. The tuner 111 acquires a video data stream of a predetermined program based on user selective operation from the received broadcast signal. The external input interface 112 gets a video data stream from an external device, such as a set top box or a disk recorder or from a network, such as the Internet.

The decode block 113 selectively executes decode processing, such as MPEG2 or MPEG4-AVC on the video data stream acquired at the tuner 111 or entered from the external input interface 112, thereby generating image data. The image processing block 114 executes image processing on the image data generated by the decode block 113. This image processing includes IP conversion processing, noise reduction processing for removing MPEG block noise, high frame rate processing for increasing the number of frames, and sharpness processing for increasing image sharpness, for example. The display panel 115 displays an image based on the image data processed by the image processing block 114. This display panel 115 is configured by a LCD (Liquid Crystal Display) panel, for example.

The following describes an operation to be executed by the television receiver 10 shown in FIG. 1. The tuner 111 acquires a video data stream of a predetermined program based on a selective operation done by a user, the obtained video data stream being supplied to the decode block 113. A video data stream entered from an external device such as a set top box or a disk recorder or a network such as the Internet into the external input interface 112 is also supplied to the decode block 113.

The decode block 113 selectively executes decode processing on the image data acquired by the tuner 111 or the video data stream entered through the external input interface 112, thereby generating image data. This image data is supplied to the image processing block 114 as input image data Vin. The image processing block 114 executes various image processing such as IP conversion processing and sharpness processing on the image data, details of which will be skipped. The processed image data is supplied to the display panel 115. Then, an image based on this image data is displayed on the display panel 115.

[Sharpness Processing]

The following describes sharpness processing for enhancing the sharpness of images that is executed by the image processing block 114. For sharpness processing, the image processing block 114 has a sharpness processing section 121 and a processing force generation section 122. On the basis of input image data Vin, the processing force generation section 122 separates the screen into two or more types of domains and generates processing forces PF corresponding to these domains. The sharpness processing section 121 executes sharpness processing on input image data Vin for each separated screen domain with processing force PF generated by the processing force generation section 122. In the present embodiment, two or more types of domains are a low-quality image domain, a high-quality image domain, a character domain, and an image and character domain.

Figure 2:
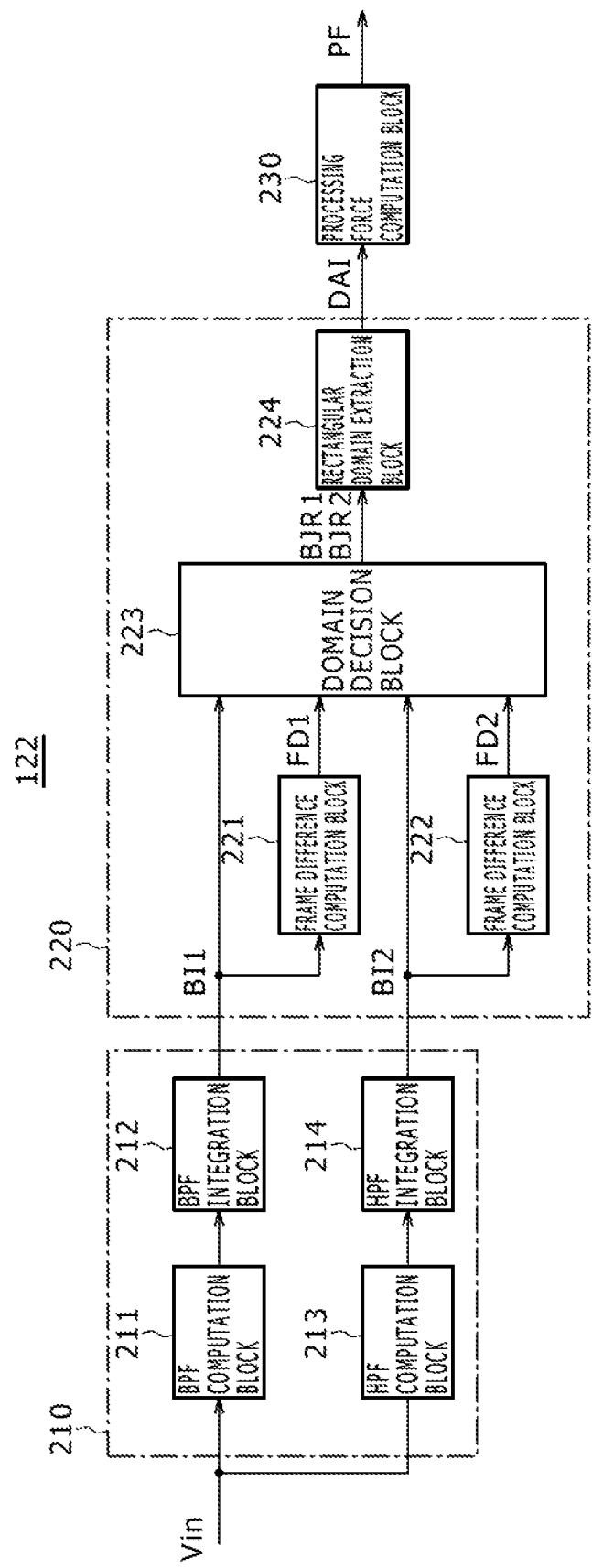
FIG. 2 is a block diagram illustrating an exemplary configuration of a processing force generation section in an image processing block that makes up the television receiver.
Figure 3:
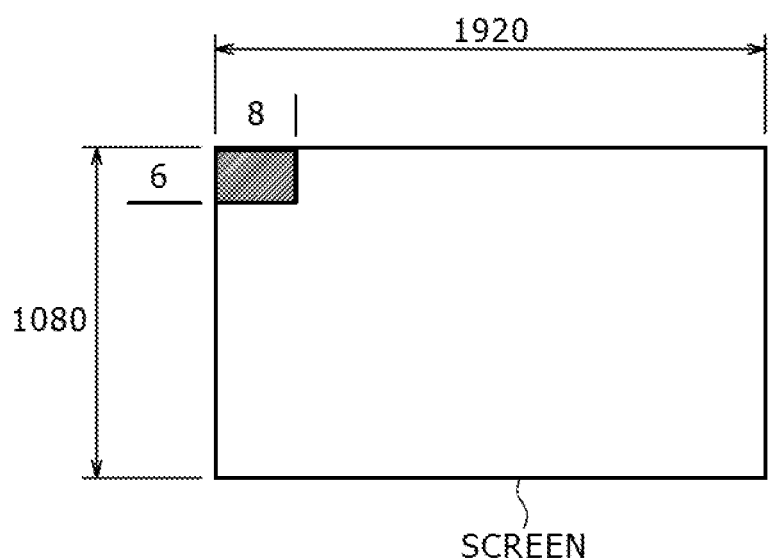
FIG. 3 is a diagram illustrating a screen dividing example.

The following describes the processing force generation section 122. Referring to FIG. 2, there is shown an exemplary configuration of the processing force generation section 122. The processing force generation section 122 has a band information acquisition unit 210, a domain separation unit 220, and a processing force computation block 230. On the basis of input image data Vin, the band information acquisition unit 210 acquires the band information of each of two or more blocks obtained by dividing the screen. In this case, as shown in FIG. 3, with a full HD (High Definition) screen of 1920 pixels horizontally and 1080 pixels vertically, for example, the screen is divided into 240×180 blocks (8 pixels vertically×6 pixels horizontally).

The band information acquisition unit 210 has a BPF (Band pass Filter) computation block 211, a BPF integration block 212, an HPF (High pass Filter) computation block 213, and an HPF integration block 214. The BPF computation block 211 executes band pass filter computation on input image data Vin to extract a band pass component of each pixel. The BPF integration block 212 integrates the band pass components extracted by the BPF computation block 211 for each block to acquire the first band information (or the band pass component information) BI1 of each block.

The HPF computation block 213 executes high pass filter computation on input image data Vin to extract a high pass component of each pixel. The HPF integration block 214 integrates the high pass components extracted by the HPF computation block 213 for each block to acquire the second band information (or the high pass component information) BI2 of each block.

The domain separation unit 220 separates the screen into two or more types of domains on the basis of the band information (the first and second band information BI1, BI2) acquired by the band information acquisition unit 210. In the present embodiment, the two or more types of domains are the low-quality image domain, the high-quality image domain, the character domain, and the image and character domain as described above. The domain separation unit 220 has frame difference computation blocks 221 and 222, a domain decision block 223, and a rectangular domain extraction block 224.

The frame difference computation block 221 obtains frame difference FD1 for each block on the basis of the first band information (or the band pass component information) BI1 acquired by the band information acquisition unit 210. The frame difference computation block 222 obtains frame difference FD2 for each block on the basis of the second band information (or the high pass component information) BI2 acquired by the band information acquisition unit 210.

It should be noted that the frame difference computation blocks 221 and 222 obtain frame differences FD1 and FD2 by use of the first and second band information BI1 and BI2, respectively. It is also possible to configure by obtaining and utilizing a frame difference absolute value for each block on the basis of input image data Vin instead of using the frame differences FD1 and FD2 obtained as described above for using as the decision of motion and motionless domains.

The domain decision block 223 determines whether each block belongs to the low-quality image domain, the high-quality image domain, the character domain, or the image and character domain on the basis of the first band information BI1 and the second band information BI2 acquired by the band information acquisition unit 210. The domain decision block 223 outputs a decision result as a first block decision result BJR1. As shown in FIG. 4, the domain decision block 223 makes the decision by determining whether the first band information (or BPF integration result) BI1 is smaller or greater than a preset threshold value and whether the second band information (or HPF integration result) BI2 is smaller or greater than a preset threshold value.

To be more specific, the domain decision block 223 determines that the block concerned belongs to the low-quality image domain if both the first band information BI1 and the second band information BI2 are found smaller than the preset threshold values. In addition, the domain decision block 223 determines that the block concerned belongs to the high-quality image domain if the first band information BI1 is found greater than the preset threshold value and the second band information BI2 is found smaller than the preset threshold value. Further, the domain decision block 223 determines that the block concerned belongs to the character domain if the first band information BI1 is found smaller than the preset threshold value and the second band information BI2 is found greater than the preset threshold value. Also, the domain decision block 223 determines that the block concerned belongs to the image and character domain if both the first band information BI1 and the second band information BI2 are found greater than the preset threshold values.

Also, the domain decision block 223 determines whether each block belongs to the motion domain or the motionless domain on the basis of the frame differences FD1 and FD2 obtained in the frame difference computation blocks 221 and 222, respectively (refer to FIG. 4). The domain decision block 223 outputs an obtained decision result as a second block decision result BJR2. The domain decision block 223 determines that a block with both frame differences FD1 and FD2 being smaller than the preset threshold value belongs to the motionless domain and other blocks belong to motion domain.

The rectangular domain extraction block 224 extracts a rectangular domain in which two or more blocks are included as two or more domains on the basis of the first and second block decision results BJR1 and BJR2 outputted from the domain decision block 223 and separates the screen into two or more types of domains. Next, the rectangular domain extraction block 224 outputs information DAI of the separated screen domains. In the present embodiment, the two or more types of domains are the low-quality image domain, the high-quality image domain, the character domain, and the image and character domain, namely, four types of domains.

The rectangular domain extraction block 224 basically extracts a rectangular area on the basis of the first block decision result BJR1. FIG. 5B shows one example of the first block decision result BJR1. In this example, for the simplification of the drawing, blocks determined to the low-quality image domain and the high-quality image domain are both indicated by "1." Further, in this example, a block determined to be the character domain is indicated by "0" and a block determined to be an image and character domain is indicated by "2." The rectangular domain extraction block 224 executes rectangular domain extraction such that the blocks determined to be these domains are included.

The rectangular domain extraction block 224 enhances the accuracy of rectangular domain extraction on the basis of the second block decision result BJR2. FIG. 5A shows one example of the second block decision result BJR2 corresponding to one example of the first block decision result BJR1 shown in FIG. 5B. In this example, the block determined to be the motionless domain is indicated by "0" and the block determined to be the motion domain is indicated by "1."

For example, with respect to a block (or an isolated point) of the character domain enclosed by blocks of the image domain, the rectangular domain extraction block 224 eliminates the isolated point by changing the decision such that the isolated point belongs to the image domain if this isolated point has been determined to be the motion domain like the blocks around the isolated point. In addition, for example, in the determination of the rectangular boundary between the image domain and the image and character domain, the rectangular domain extraction block 224 changes the decision such that the block concerned belongs to the image domain if the motion domain is determined even if the block concerned is of the image and character domain.

On the basis of information DAI of the separated screen domain outputted from the domain separation unit 220, namely, the rectangular domain extraction block 224, the processing force computation block 230 obtains processing force PF for each of the separated screen domains. In this case, for example, the processing forces of the blocks included in the character domain and the image and character domain are common to each other and set lower than the processing force of each of the blocks included in the image domain, for example.

Figure 6:
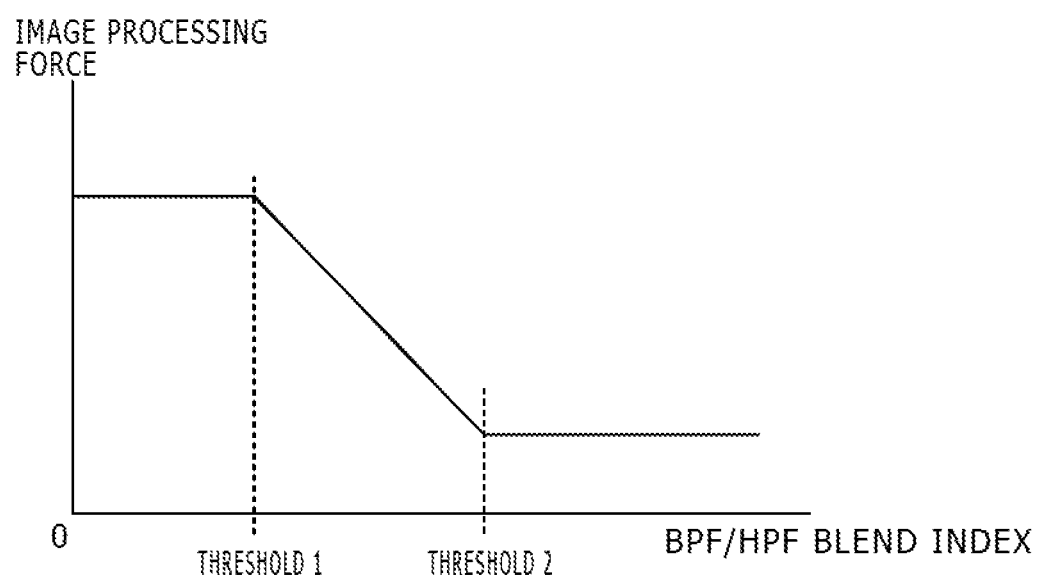
FIG. 6 is a diagram illustrating the provision of a processing force corresponding to a blend index of the first band information (or band pass component information) and the second band information (or high pass component information) for the processing force of each of the blocks of an image domain.

In the above-mentioned case, the processing forces of the blocks included in the image domain may be common to each other and set high in the processing force of the low-quality image domain and low in the processing force of the high-quality image domain. In the present embodiment, with respect to the processing forces of the blocks of the image domain, the processing forces corresponding to the blend index of the first band information (or the band pass component information) BI1 and the second band information (or the high pass component information) BI2 in the characteristic shown in FIG. 6. It should be noted that, in this case, for the block with a block (or an isolated point) in the character domain changed into the image domain, the average of the blend index of surrounding blocks is used.

In the blend index in the above-mentioned case is expressed by equation (1) below. In equation (1), $\alpha$ indicates blend index, taking a value between 0 and 1 inclusive. It should be noted that, in equation (1), threshold value 1 and threshold value 2 may be set arbitrarily.

$$\text{Blend index} = BI1 \times \alpha + BI2 \times (1-\alpha) \qquad (1)$$

The following briefly describes an operation to be executed by the processing force generation section 122 shown in FIG. 2. Input image data Vin is supplied to the BPF computation block 211 and the HPF computation block 213 of the band information acquisition unit 210. The BPF computation block 211 executes band pass filter computation on the input image data Vin to extract a band path component for each pixel. This band pass component for each pixel is supplied to the BPF integration block 212. The BPF integration block 212 integrates the band pass components for each block, thereby providing the first band information (or band pass component information) BI1 of each block.

The HPF computation block 213 executes high pass filter computation on the input image data Vin to extract a high pass component for each pixel. This high pass component for each pixel is supplied to the HPF integration block 214. The HPF integration block 214 integrates the high pass components for each block to provide the second band information (or the high pass component information) BI2 of each block.

The first band information (or the band pass component information) BI1 acquired by the BPF integration block 212 of the band information acquisition unit 210 is supplied to the domain decision block 223 and the frame difference computation block 221 of the domain separation unit 220. The second band information (or the high pass component information) BI2 acquired by the HPF integration block 214 of the band information acquisition unit 210 is supplied to the domain decision block 223 and the frame difference computation block 222 of the domain separation unit 220.

The frame difference computation block 221 obtains frame difference FD1 for each block on the basis of the first band information (or the band pass component information) BI1. The frame difference computation block 222 obtains frame difference FD2 for each block on the basis of the second band information (or the high pass component information) BI2. The frame differences FD1 and FD2 are supplied to the domain decision block 223.

The domain decision block 223 determines on the basis of the first band information BI1 and the second band information BI2 to which of the low-quality image domain, the high-quality image domain, the character domain, and the image and character domain each of the blocks belongs. The domain decision block 223 outputs an obtained decision result as the first block decision result BJR1. The domain decision block 223 determines on the basis of the frame differences FD1 and FD2 to which of the motion domain and the motionless domain each of the blocks belongs. The domain decision block 223 outputs an obtained decision result as the second block decision result BJR2.

The first and second block decision results BJR1 and BJR2 outputted from the domain decision block 223 are supplied to the rectangular domain extraction block 224. On the basis of the supplied first and second block decision results BJR1 and BJR2, the rectangular domain extraction block 224 extracts a rectangular domain including two or more blocks as two or more types of domains, thereby separating the screen into two or more types of domains. The rectangular domain extraction block 224 outputs information DAI of these separated screen domains.

The information DAI of the separated screen domains outputted from the rectangular domain extraction block 224 is supplied to the processing force computation block 230. On the basis of the supplied information DAI, the processing force computation block 230 obtains processing force PF for each of the separated screen domains. This processing force PF is supplied to the sharpness processing section 121 (refer to FIG. 1). The sharpness processing section 121 executes, with the processing force PF obtained by the processing force computation block 230, sharpness processing on the input image data for each of the screen domains separated by the domain separation unit 220.

For example, the sharpness processing forces of the blocks included in the character domain and the image and character domain are common to each other and set lower than the sharpness processing forces of the blocks included in the image domain. For example, with respect to the processing force of each block in the image domain, the sharpness processing section 121 sets the processing force corresponding to a blend index of the first band information (or the band pass component information) BI1 and the second band information (or the high pass component information) BI2. In this case, the processing force is set high in the low-quality image domain and low in the high-quality image domain.

As described above, in the television receiver 10 shown in FIG. 1, in the sharpness processing by the image processing block 114, the screen is separated into two or more types of domains on the basis of the band information of each block and the sharpness processing is executed by obtaining a processing force for each of the separated screen domains. Therefore, the image processing can be properly executed on the image data of content in which there are both images and characters at the same time.

In the television receiver 10 shown in FIG. 1, the sharpness processing by the image processing block 114 determines on the basis of the band information of each block to which of the two or more types of domains each block belongs. On the basis of an obtained decision, the sharpness processing extracts a rectangular domain including two or more blocks as the two or more types of domains, thereby separating the screen into two or more types of domains. Consequently, for example, a block determined belonging to the character domain enclosed by blocks determined belonging to the image domain, namely, an isolated point, can be excluded in the extraction of a rectangular domain, thereby preventing the connection between blocks from becoming conspicuous.

In the television receiver 10 shown in FIG. 1, the sharpness processing by the image processing block 114 obtains a processing force corresponding to a blend index of the first band information (or the band pass component information) and the second band information (or high pass component information) for each block. Consequently, with respect to the image domain, a proper processing force corresponding to the quality of image can be obtained for each block, thereby properly executing the sharpness processing in the image domain.

In the television receiver 10 shown in FIG. 1, the sharpness processing by the image processing block 114 determines in which of the motion domain and the motionless domain each block is included. Then, in addition to the decision result of each block's belonging to any one of the two or more types domains, a decision result of each block's belonging to the motion domain or the motionless domain is used to extract a rectangular domain including two or more blocks as the two or more types of domains. Accordingly, the accuracy of rectangular extraction can be enhanced.

In the television receiver 10 shown in FIG. 1, upon the sharpness processing by the image processing block 114, it is determined each block belongs to the motion domain or the motionless domain on the basis of a frame difference of band information for each block acquired by the band information acquisition unit 210. Consequently, the computation load for the decision processing can be minimized.

<Variations>

It should be noted that, in the embodiment described above, the description was made by use of an example in which sharpness processing is executed by obtaining the processing force of each block on the basis of input image data. However, the image processing to which the present technology is applied is not limited to sharpness processing, but other processing, namely, the present technology can also be applied to the image processing in which the processing is executed on the basis of different processing forces in the image domain and the character domain. For example, in addition to sharpness processing, the present technology can be applied to noise reduction processing for reducing MPEG block noise.

It should be noted that the technology disclosed herein can take a configuration described below.

(1) An image processing apparatus including:

a band information acquisition unit configured to acquire band information of each of a plurality of blocks acquired by dividing a screen on the basis of input image data;

a domain separation unit configured to separate a screen into a plurality of types of domains on the basis of the band information of each of the plurality of blocks acquired by the band information acquisition unit;

a processing force computation block configured to obtain a processing force for each of the plurality of types of screen domains separated by the domain separation unit; and an image processing block configured to execute predetermined image processing on the input image data for each of the plurality of types of screen domains separated by the domain separation unit with a processing force obtained by the processing force computation block.

(2) The image processing apparatus according to (1), wherein the band information acquisition unit acquires first band information of each of the plurality of blocks by integrating, for each of the plurality of blocks, band pass components of pixels acquired by executing band pass filter computation on the input image data and acquires second band information of each of the plurality of blocks by integrating, for each of the plurality of blocks, high pass components of pixels acquired by executing high pass filter computation on the input image data.

(3) The image processing apparatus according to (1) or (2), wherein the domain separation unit determines to which of the plurality of types of domains each of the plurality of blocks belongs on the basis of the band information of each of the plurality of blocks and, on the basis of an obtained decision result, extracts a rectangular domain in which a plurality of blocks are included as the plurality of types of domains, thereby separating a screen into the plurality of types of domains.

(4) The image processing apparatus according to any one of (1) through (3), wherein the plurality of types of domains are a low-quality image domain, a high-quality image domain, a character domain, and an image and character domain.

(5) The image processing apparatus according to (4), wherein the band information acquisition unit acquires first band information of each of the plurality of blocks by integrating, for each of the plurality of blocks, band pass components of pixels acquired by executing band pass filter computation on the input image data and acquires second band information of each of the plurality of blocks by integrating, for each of the plurality of blocks, high pass components of pixels acquired by executing high pass filter computation on the input image data; and the processing force computation block obtains a processing force corresponding to a blend index of the first band information and the second band information for each of the plurality of blocks with respect to the low-quality image domain and the high-quality image domain.

(6) The image processing apparatus according to (3), further including:

a motion/motionless decision block configured to determine on the basis of the input image data in which of a motion domain and a motionless domain each of the plurality of blocks is included, wherein on the basis of the band information of each of the plurality of blocks, the domain separation unit extracts a rectangular domain in which a plurality of blocks are included as the plurality of types of domains on the basis of the decision result obtained by the determination to which of the plurality of types of domains each of the plurality of blocks belongs as well as the decision result obtained by the motion/motionless decision block.

(7) The image processing apparatus according to (6), wherein the motion/motionless decision block determines in which of the motion domain and the motionless domain each of the plurality of blocks is included on the basis of a frame difference of the band information of each of the plurality of blocks acquired by the band information acquisition unit.

(8) The image processing apparatus according to any one of (1) through (7), wherein the predetermined image processing is sharpness processing.

(9) An image processing method including the steps of:
acquiring band information of each of a plurality of blocks acquired by dividing a screen on the basis of input image data;
separating a screen into a plurality of types of domains on the basis of the band information of each of the plurality of blocks acquired in the band information acquisition step;
obtaining a processing force for each of the plurality of types of screen domains separated in the domain separation step; and
executing predetermined image processing on the input image data for each of the plurality of types of screen domains separated in the domain separation step with a processing force obtained in the processing force computation step.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
a processor configured to operate as a band information acquisition unit configured to acquire band information of each of a plurality of blocks acquired by dividing a screen on the basis of input image data, a domain separation unit configured to separate a screen into a plurality of types of domains on the basis of said band information of each of said plurality of blocks acquired by said band information acquisition unit, a processing force computation block configured to obtain a processing force for each of said plurality of types of screen domains obtained by said domain separation unit, and an image processing block configured to execute predetermined image processing on said input image data for each of said plurality of types of screen domains separated by the domain separation unit with a processing force separated by said processing force computation block.

2. The image processing apparatus according to claim 1, wherein
said band information acquisition unit acquires first band information of each of said plurality of blocks by integrating, for each of said plurality of blocks, band pass components of pixels acquired by executing band pass filter computation on said input image data and acquires obtains second band information of each of said plurality of blocks by integrating, for each of said plurality of blocks, high pass components of pixels acquired by executing high pass filter computation on said input image data.

3. The image processing apparatus according to claim 1, wherein
said domain separation unit determines to which of said plurality of types of domains each of said plurality of blocks belongs on the basis of said band information of each of said plurality of blocks and, on the basis of an obtained decision result, extracts a rectangular domain in which a plurality of blocks are included as said plurality of types of domains, separating a screen into said plurality of types of domains.

4. The image processing apparatus according to claim 1, wherein said plurality of types of domains are a low-quality image domain, a high-quality image domain, a character domain, and an image and character domain.

5. The image processing apparatus according to claim 4, wherein
said band information acquisition unit acquires first band information of each of said plurality of blocks by integrating, for each of said plurality of blocks, band pass components of pixels acquired by executing band pass filter computation on said input image data and acquires second band information of each of said plurality of blocks by integrating, for each of said plurality of blocks, high pass components of pixels acquired by executing high pass filter computation on said input image data; and
said processing force computation block obtains a processing force corresponding to a blend index of said first band information and said second band information for each of said plurality of blocks with respect to said low-quality image domain and said high-quality image domain.

6. The image processing apparatus according to claim 3, in which the processor is further configured to operate as a motion/motionless decision block configured to determine on the basis of said input image data in which of a motion domain and a motionless domain each of said plurality of blocks is included, wherein
on the basis of said band information of each of said plurality of blocks, said domain separation unit extracts a rectangular domain in which a plurality of blocks are included as said plurality of types of domains on the basis of said decision result obtained by the determination to which of said plurality of types of domains each of said plurality of blocks belongs as well as said decision result obtained by said motion/motionless decision block.

7. The image processing apparatus according to claim 6, wherein
said motion/motionless decision block determines in which of said motion domain and said motionless domain each of said plurality of blocks is included on the basis of a frame difference of said band information of each of said plurality of blocks acquired by said band information acquisition unit.

8. The image processing apparatus according to claim 1, wherein said predetermined image processing is sharpness processing.

9. An image processing method, comprising:
acquiring band information of each of a plurality of blocks acquired by dividing a screen on the basis of input image data;

separating a screen into a plurality of types of domains on the basis of said band information of each of said plurality of blocks acquired in said band information acquisition;

obtaining a processing force for each of said plurality of types of screen domains separated in said domain separation; and executing predetermined image processing on said input image data for each of said plurality of types of screen domains separated in said domain separation with a processing force obtained in said processing force computation, in which the acquiring, the separating, the obtaining, and the executing are performed by use of a processor.

* * * * *